US012228992B2

(12) United States Patent
Regupathy et al.

(10) Patent No.: US 12,228,992 B2
(45) Date of Patent: Feb. 18, 2025

(54) SYSTEM POWER MANAGEMENT IN MULTI-PORT I/O HYBRID SYSTEMS

(71) Applicant: Intel Corporation, Santa Clara, CA (US)

(72) Inventors: Rajaram Regupathy, Bangalore (IN); Abdul R. Ismail, Beaverton, OR (US); Ziv Kabiry, Kfar-Saba (IL); Abhilash K V, Bangalore (IN); Purushotam Kumar, Bangalore (IN); Gaurav Kumar Singh, Bangalore (IN)

(73) Assignee: Intel Corporation, Santa Clara, CA (US)

(*) Notice: Subject to any disclaimer, the term of this patent is extended or adjusted under 35 U.S.C. 154(b) by 796 days.

(21) Appl. No.: 16/996,112

(22) Filed: Aug. 18, 2020

(65) Prior Publication Data
US 2021/0055777 A1 Feb. 25, 2021

(51) Int. Cl.
G06F 1/3228 (2019.01)
G06F 1/3212 (2019.01)
G06F 9/30 (2018.01)
G06F 13/38 (2006.01)
G06F 13/40 (2006.01)
G06F 13/42 (2006.01)

(52) U.S. Cl.
CPC .......... *G06F 1/3228* (2013.01); *G06F 1/3212* (2013.01); *G06F 9/30101* (2013.01); *G06F 13/385* (2013.01); *G06F 13/409* (2013.01); *G06F 13/4221* (2013.01)

(58) Field of Classification Search
CPC .. G06F 13/385; G06F 13/4221; G06F 1/3212; G06F 9/30101; G06F 13/409; G06F 13/228
See application file for complete search history.

(56) References Cited

U.S. PATENT DOCUMENTS

| 2015/0121095 | A1* | 4/2015 | Tsai ........................ G06F 1/266 713/310 |
| 2017/0329386 | A1* | 11/2017 | Winemiller ............. G06F 1/324 |
| 2018/0120910 | A1* | 5/2018 | Farkas ..................... G06F 1/26 |
| 2019/0036365 | A1* | 1/2019 | Regupathy .......... H02J 7/00034 |
| 2019/0138078 | A1* | 5/2019 | Regupathy ............ G06F 1/3253 |
| 2019/0332558 | A1* | 10/2019 | Goel ...................... H04L 47/41 |
| 2020/0192832 | A1* | 6/2020 | Regupathy .......... G06F 13/1668 |

* cited by examiner

Primary Examiner — Nimesh G Patel
(74) Attorney, Agent, or Firm — Alliance IP, LLC

(57) ABSTRACT

In one embodiment, an apparatus includes a host controller to implement one or more layers of a Universal Serial Bus (USB)-based protocol to provide an interconnect for a plurality of devices. The host controller is to monitor control plane messages on the interconnect, detect, in the control plane messages, a power state change command for a device coupled to the interconnect, wherein the devices utilizes a tunneled protocol on the interconnect, and modify power distribution for one or more other devices of the interconnect based on detecting the power state change command.

18 Claims, 11 Drawing Sheets

SYSTEM POWER MANAGEMENT IN MULTI-PORT I/O HYBRID SYSTEMS

TECHNICAL FIELD

This disclosure relates in general to the field of computer systems and, more particularly, to a system power management in multi-port input/output (I/O) hybrid systems.

BACKGROUND

Universal Serial Bus (USB) specifications have evolved over more than a decade to provide a ubiquitous interface for peripherals to connect peripherals to computer systems. The evolution of USB bus speed in these years has gone from 1.5 Mbps in the USB v1.1 specification to 10 Gbps in the USB v3.1 specification. With the introduction of the USB Type-C port and USB Power Delivery specifications, the USB-C port has extended the USB port functionality to power and display capabilities. The USB-C port has also enabled expansion of the bandwidth of the USB bus to 20 Gbps with the introduction of USB v3.2 specification, which uses additional signal lines made available by the USB-C ports.

Further evolution of USB-based protocols (e.g., USB v4) may allow for a connection-oriented, tunneling architecture to combine multiple protocols (e.g., USB-based protocols, Peripheral Component Interconnect Express (PCIe)-based protocols, DisplayPort (DP)-based protocols, and/or host-to-host protocols) onto a single physical interface so that the total speed and performance of the USB fabric can be dynamically shared not just between USB devices, but also PCIe or DP end-points. The total bandwidth may be expanded to 40 Gbps (e.g., twice the USB v3 bandwidth) over a Type-C connector.

BRIEF DESCRIPTION OF THE DRAWINGS

Like reference numbers and designations in the various drawings indicate like elements.

DETAILED DESCRIPTION OF EXAMPLE EMBODIMENTS

Figure 1:
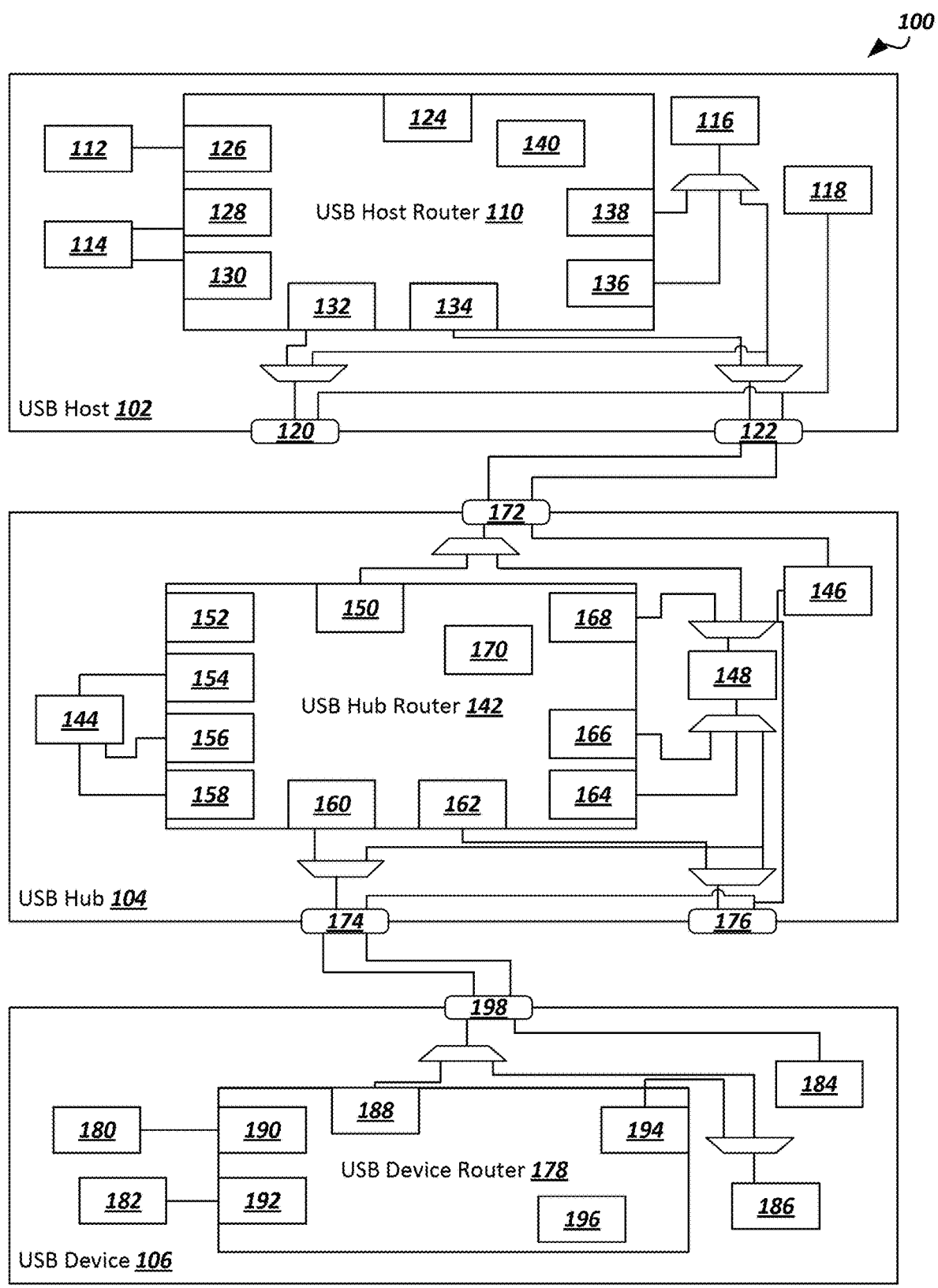
FIG. 1 is a schematic diagram of an example universal serial bus (USB) system in accordance with embodiments of the present disclosure.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

Universal Serial Bus (USB) specifications have evolved over more than a decade to provide a ubiquitous interface for peripherals to connect peripherals to computer systems. The evolution of USB bus speed in these years has gone from 1.5 Mbps in the USB v1.1 specification to 10 Gbps in the USB v3.1 specification. With the introduction of the USB Type-C port and USB Power Delivery (PD) specifications, the USB-C port has extended the USB port functionality to power and display capabilities. The USB-C port has also enabled expansion of the bandwidth of the USB bus to 20 Gbps with the introduction of USB v3.2 specification, which uses additional signal lines made available by the USB-C ports. USB Class specifications define the functionalities above this USB bus have also evolved take to advantage of this USB bandwidth increase to provide better user experiences and further leverage the capability of the USB bus.

Further evolution of USB-based protocols (e.g., USB v4) may allow for a connection-oriented, tunneling architecture to combine multiple protocols (e.g., USB-based protocols, Peripheral Component Interconnect Express (PCIe)-based protocols, DisplayPort (DP)-based protocols, and/or host-to-host protocols) onto a single physical interface so that the total speed and performance of the USB fabric can be dynamically shared not just between USB devices, but also PCIe or DP end-points. The total bandwidth may be expanded to 40 Gbps (e.g., twice the USB Gen 3 bandwidth) over a Type-C connector. In addition, further evolution of USB-based protocols may allow for support of Thunderbolt interfaces and may enable daisy-chaining of devices.

In some embodiments, power requirements may be in accordance with the USB-C/USB PD specification. For example, power for USB operations may be established and managed as defined in the USB Type-C Specification and the USB PD Specification. Further, in some embodiments, suspend power may be defined based on the capabilities of the USB device. For example, a USB-compatible device that is not capable of remote wake (or has remote wake disabled) may call for approximately 25 mW of power, whereas a USB-compatible device that supports remote wake (or has remote wake enabled) may call for approximately 50 mW of power.

The USB Power Delivery (PD) protocol allows a power Sink device (i.e., the USB-connected device that receives power over a USB physical connection) to let the power Source device (i.e., the USB-connected device that provides power over a USB physical connection) know whether the Sink device has USB data lines. For example, if a "USB Communications Capable" flag has been set to zero by a Sink, then the Source may be aware that USB Suspend rules cannot be observed by the Sink. Also, a "No USB Suspend" bit can be set by a power Sink device to indicate that its existing power draw should be continued during USB Suspend events, and should not be switched to a lower power profile (e.g., "pSnkSusp").

TABLE 1

Power Data Object (PDO) Bits

| Bits | Description |
| --- | --- |
| B31 | Reserved - Shall be set to zero |
| B30 . . . 28 | Object position (000b is Reserved and shall not be used) |
| B27 | GiveBack flag = 0 |
| B26 | Capability Mismatch |
| B25 | USB Communications Capable |
| B24 | No USB Suspend |
| B23 | Unchunked Extended Messages Supported |
| B22 . . . 20 | Reserved - Shall be set to zero |
| B19 . . . 10 | Operating current in 10 mA units |
| B9 . . . 0 | Maximum Operating Current 10 mA units |

In some cases, additional protocols like DisplayPort may be tunneled on the same lines. This may have additional low power mode (LPM requirements as indicated below:

2:0 SET_POWER_STATE
  Shall be programmed to 001b upon power-on reset or an upstream
  device disconnect.
  001b = Set local Sink device and all downstream Sink devices to D0
  (normal operation mode).
  010b = Set local Sink device and all downstream Sink devices to D3
  (power-down mode).
  101b = Set Main-Link for local Sink device and all downstream Sink
  devices to D3
  (power-down mode), keep AUX block fully powered, ready to reply
  within the AUX Response Timeout timer period FIG. 1 is a schematic diagram of an example universal serial bus (USB) system 100 in accordance with embodiments of the present disclosure. FIG. 1 illustrates the dual bus architecture of an example USB system 100, such as those implemented by USB v4 (also referred to herein as "USB4") or higher protocols. As architected, backward compatibility is supported with minimum interoperability starting at USB v2.0, working up through USB v3.2, and finally up to USB4 based on the highest common bus level supported across the interconnected components.

The USB system 100 can include a USB4 host 102 connected to a USB4 hub 104 by a USB link. The USB4 hub 104 can be connected to a USB4 device 106 by a USB link. The USB4 hub 104 can also be connected to other types of devices, such as displays or peripherals or other types of devices. The USB4 host 102 can be (or can be coupled to) a host device, such as a host device, computer, server, motherboard, processor or processor bank, or other type of host device. The USB4 hub 104 can be (or can include) a dongle, docking station, or other intermediate device. The USB4 device 106 can be an endpoint device, peripheral device, memory, or other type of device that connects to the USB4 host 102 and/or USB4 hub 104.

The system 100 can include a USB4 host 102. The USB4 host can include a host router 110, an internal host controller, and DisplayPort source 112, such as a DisplayPort2.0 source. The DisplayPort2.0 (or DP2.0) source can be a graphics processor and can include a DisplayPort transmitter (DPTX) that supports DP2.0 and higher. The DPTX can be compliant with a Video Electronics Standards Association (VESA) DisplayPort 2.0 protocol standard or future DisplayPort protocol standards versions.

A USB4 host supports 20G USB4 operation (Gen2×2) and optionally 40G USB4 operation (Gen3×2). A USB4 host can also support DisplayPort Alt Mode on all of its downstream facing ports (DFP). See the USB Type-C Specification for a full definition of the requirements and details regarding DisplayPort Alt Mode support on a DFP.

A USB4 host can also optionally contain a PCIe controller 114. PCIe controller 114 can include (or be connected to) a PCIe root complex or PCIe switch complex for controlling PCIe-based routing to one or more peripheral devices. The PCIe controller 114 can be connected to the USB4 host router 110 through one or more PCIe adapters (e.g., PCIe downstream facing adapters 128, 130). The USB4 hub 104 can include (or be connected to) a PCIe switch 144 via PCIe upstream facing adapter 154 and PCIe downstream facing adapters 156 and 158. The USB4 device 106 can include a PCIe function 180 that is the PCIe downstream connected component or endpoint device that communicates with the PCIe controller 114 across the USB4 fabric 100. The USB4 device router 178 can include a PCIe upstream facing adapter 190 to couple the PCIe function 180 with upstream connected components, such as the USB4 hub 104, PCIe switch 144, and PCIe controller 114.

The USB4 host 102 can include a USB host router 110. The USB4 hub 104 can include a USB hub router 142. The USB4 device 106 can include a USB device router 178. A router is a fundamental building block of the USB4 architecture. A router maps Tunneled Protocol traffic to USB4 packets and routes packets through the USB4 fabric 100. A router also distributes and synchronizes time throughout the USB4 Fabric via its Time Management Unit (TMU), such as TMU 140, 170, and 196. A router is discovered and configured by a connection manager (e.g., a host interface adapter) 124 located within the USB4 host. The router includes a flat point-to-point, configurable switch necessary to create the internal paths between adapters. One router typically exists within each instance of a USB4 host 102, USB4 hub 104, or USB4 device 106. There are two types of Routers: Host Routers and Device Routers.

USB4 host or USB4 peripheral device can optionally support interoperability with Thunderbolt 3 (TBT3) products. A USB4 hub is required to support interoperability with Thunderbolt 3 products on all of its DFP. A USB4-Based Dock is required to support interoperability with Thunderbolt 3 products on its upstream facing ports (UFP) in addition to all of its DFP.

When interoperating with a TBT3 product, Thunderbolt Alt Mode is established on the link between products. The USB Type-C Specification describes how a USB4 product negotiates and enters Thunderbolt Alt Mode.

The USB4 host 102 can include (or can be connected to) a display port (DP) source 112, such as a graphics processing unit (GPU) or other source of graphics, video, images, etc. The USB4 host router 110 can include a DP_IN adapter 126 that can facilitate an interface to the DP source 112. In embodiments, the DP source can be a USB4 peripheral device or can be connected to the USB4 host router 110 via a DisplayPort-based interconnect (e.g., via a DisplayPort 2.0 protocol interconnect).

The USB4 hub 104 can include a DP_OUT adapter 152 for outputting DP signaling to a DP sink, such as a display or monitor. The USB4 hub 104 can also transmit DP signaling via a USB4 tunnel to the USB4 device 106. The USB4 device 106 can include a DP_OUT adapter 192 for outputting DP signals to a DP sink 182, which can be a display or monitor.

The internal Enhanced SuperSpeed host 116 exposes one or more Downstream USB3 ports, which can be connected to a USB Endpoint or Downstream USB3 Protocol Adapter. The upstream port of the internal Enhanced SuperSpeed Hub interfaces with an Upstream USB3 Protocol Adapter that forwards packets to the Upstream Facing Port of the USB4 hub.

Each router contains up to 64 adapters. Adapters provide an interface between a router and an external entity. There are three types of Adapters: Protocol Adapters, Lane Adapters, and Control Adapters. A Protocol Adapter is used to translate between a supported native protocol and a USB4 tunnel. There are four types of Protocol Adapters: USB3 Adapters 136, 138, 164, 166, 168, and 194, DisplayPort (DP) Adapters 126, 152, and 182, PCIe Adapters 128, 130, 154, 156, 158, and 190, and Host Interface Adapters 124.

A router can support an internal Control Adapter that is used solely for transmitting and receiving Control packets to and from the Transport Layer. Unlike the non-Control Adapters, the Control Adapter does not connect directly to a Link and thus does not have a Physical Layer associated with it.

A USB4 Port is the entity that provides the USB4 functional interface that resides on each end of a USB4 Link. It consists of the transmit and receive Lanes of the USB4 data bus along with a two-wire Sideband (SB) Channel (SBTX/SBRX). USB4 Ports operate as either a Single-Lane Link or Dual-Lane Link. When operating as a Single-Lane Link, Lane 1 of the USB4 Port is disabled. When operating as a Dual-Lane Link, Lanes 0 and 1 are logically bonded together to provide a single data channel. Example USB4 ports are shown as elements 132, 134, 160, 162, and 188. The USB4 ports can accommodate a USB Type-C connector or Thunderbolt (e.g., TBT3) type connector, etc.

The primary communication channel of the USB4 Fabric is over the USB4 Link that interconnects two USB4 Ports. The USB4 Link transports packets for both Tunneled Protocol traffic and bus management traffic between Routers. The Sideband Channel of a USB4 Port is used to initialize and manage the USB4 Link between the USB4 Ports. For a USB4-enabled USB Type-C port, the complete interface includes a USB4 Port, a USB 2.0 data bus, and the USB Type-C Configuration Channel (CC) along with power/ground (VBUS, VCONN and GND).

At a high level, a USB4 hub 104 is functionally similar to a USB 3.2 hub—it consists of one Upstream Facing Port and one or more Downstream Facing Ports. USB4 hub 104 functionally operates as a tree-like structure for enabling one or more Downstream Facing Ports to be served by one Upstream Facing Port, typically for the purpose of port expansion.

In addition to the USB4-specific hub functionality, USB 3.2 and USB 2.0 hub functionality is supported such that Downstream Facing Ports of a USB4 hub can support backward-compatibility with USB 3.2 and USB 2.0 devices. USB 2.0 functionality can be provided via USB 2.0 host 118 connected to a USB 2.0 hub 146 and USB 2.0 function 184.

A USB4 hub contains a Device Router, an Enhanced SuperSpeed USB hub, a PCIe switch, and a USB 2.0 hub. A USB4 hub supports 20G USB4 operation (Gen2×2) and 40G USB4 operation (Gen3×2). A USB4 hub is required to support DisplayPort Alt Mode on all of its DFP. See the USB Type-C Specification for a full definition of the requirements and details regarding DisplayPort Alt Mode support on a DFP.

The USB4 host 102, hub 104, and device 106 can include one or more USB Type-C connector ports 120, 122, 172, 174, 176, and 198. The USB Type-C connector ports can receive USB Type-C connectors for connected USB compliant components and for transferring information and power between components.

Figure 2A:
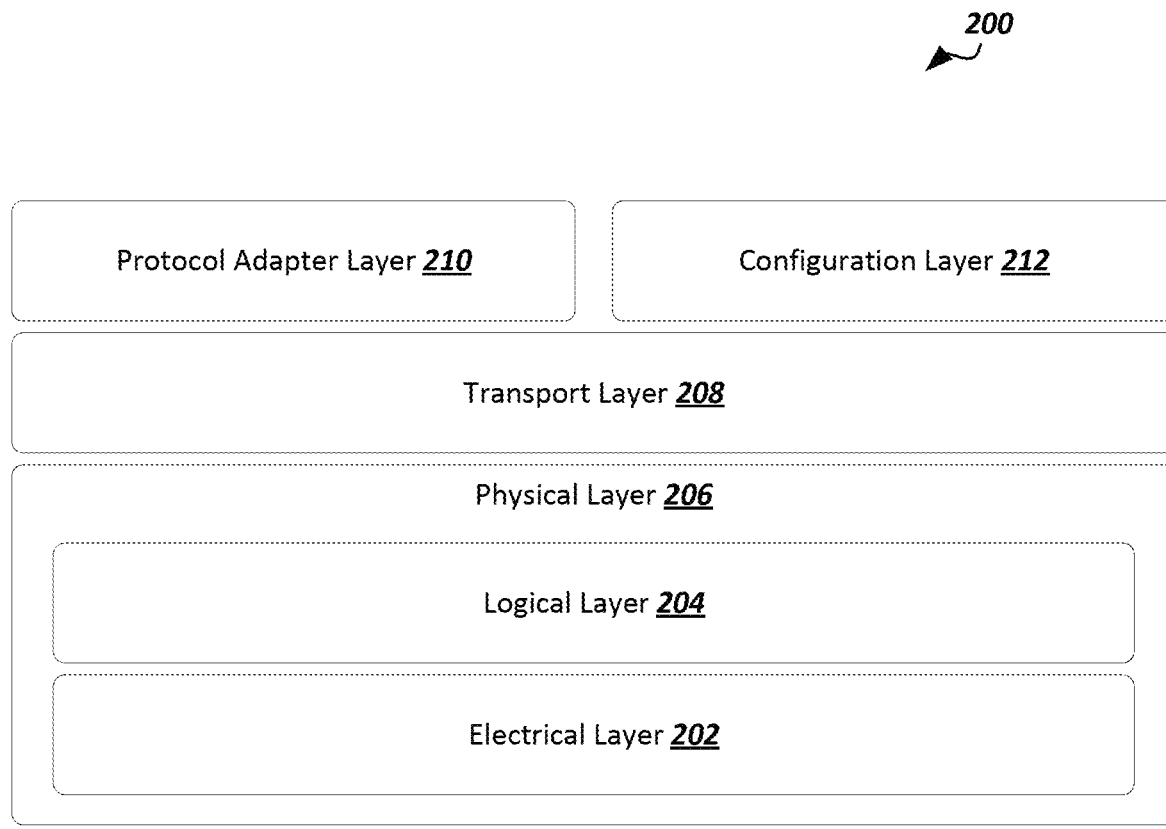
FIG. 2A is a schematic diagram of an example USB protocol stack in accordance with embodiments of the present disclosure.

FIG. 2A is a schematic diagram of an example USB protocol stack 200 in accordance with embodiments of the present disclosure. The USB4 protocol stack 200 can include an electrical layer 202 and a logical layer 204. The electrical layer 202 and logical layer 204 can be considered sub-blocks of the physical layer 206. The electrical layer 202 defines electrical signaling characteristics of a USB4 Link including scrambling, encoding, jitter, and voltage. The logical layer 206 establishes a USB4 link between two routers and provides services to transmit and receive streams of bytes between them. The logical layer 204 resides on top of the electrical layer 202 and below the transport layer 208. The logical layer 204 treats the traffic to and from the transport layer 208 as a byte stream.

The services provided by the logical layer 204 are establishment and maintenance of a USB4 Link with a Link Partner, performance scalability via different speeds and widths, error detection and recovery mechanisms, operation with different media such as passive cable, active cable, and re-timers, support for mechanisms such as clocking compensation, data scrambling, and Forward-error-correcting codes, and power management.

A USB4 link is assisted and managed by a companion Sideband Channel that configures parameters of the USB4 link, interacts with re-timers (if present) and performs USB4 link TxFFE handshake, ensures a correct power down/wake up sequence of the USB4 Link transceivers and Retimers.

The transport layer 208 forwards tunneled packets and control packets through the bus. The transport layer 208 defines packet format, routing, Quality-of-Service (QoS) support, flow control, and time synchronization. The transport layer 208 is where protocol MUXing is performed.

The configuration layer 212 performs router configuration tasks and handles incoming control packets. The configuration layer 212 provides an addressing scheme for control packets within the domain, processes control packets, and delivers a reliable transport mechanism for control packets. Control packets provide the connection manager with access to the configuration spaces of a router.

The protocol adapter layer 210 performs mapping between Tunneled Protocol traffic and USB4 Transport layer packets. A protocol adapter layer 210 is defined by the type of tunneled protocol traffic it sends and receives.

A USB4 host supports USB3 Tunneling, DisplayPort Tunneling, and Host-to-Host Tunneling. A USB4 host can also optionally support PCIe Tunneling. A USB4 hub supports USB3 Tunneling, DisplayPort Tunneling, PCIe Tunneling, and Host-to-Host Tunneling. There are multiple ways that a USB4 hub supports DisplayPort Tunneling. For example, the USB4 hub acts as a "pass through" for DisplayPort Tunneling (i.e. the USB4 hub routes tunneled traffic directly between two of its USB4 Ports). The USB4 hub contains a DP OUT Adapter that receives Tunneled DisplayPort traffic from a USB4 Port and sends it to a DisplayPort Sink.

Figure 2B:
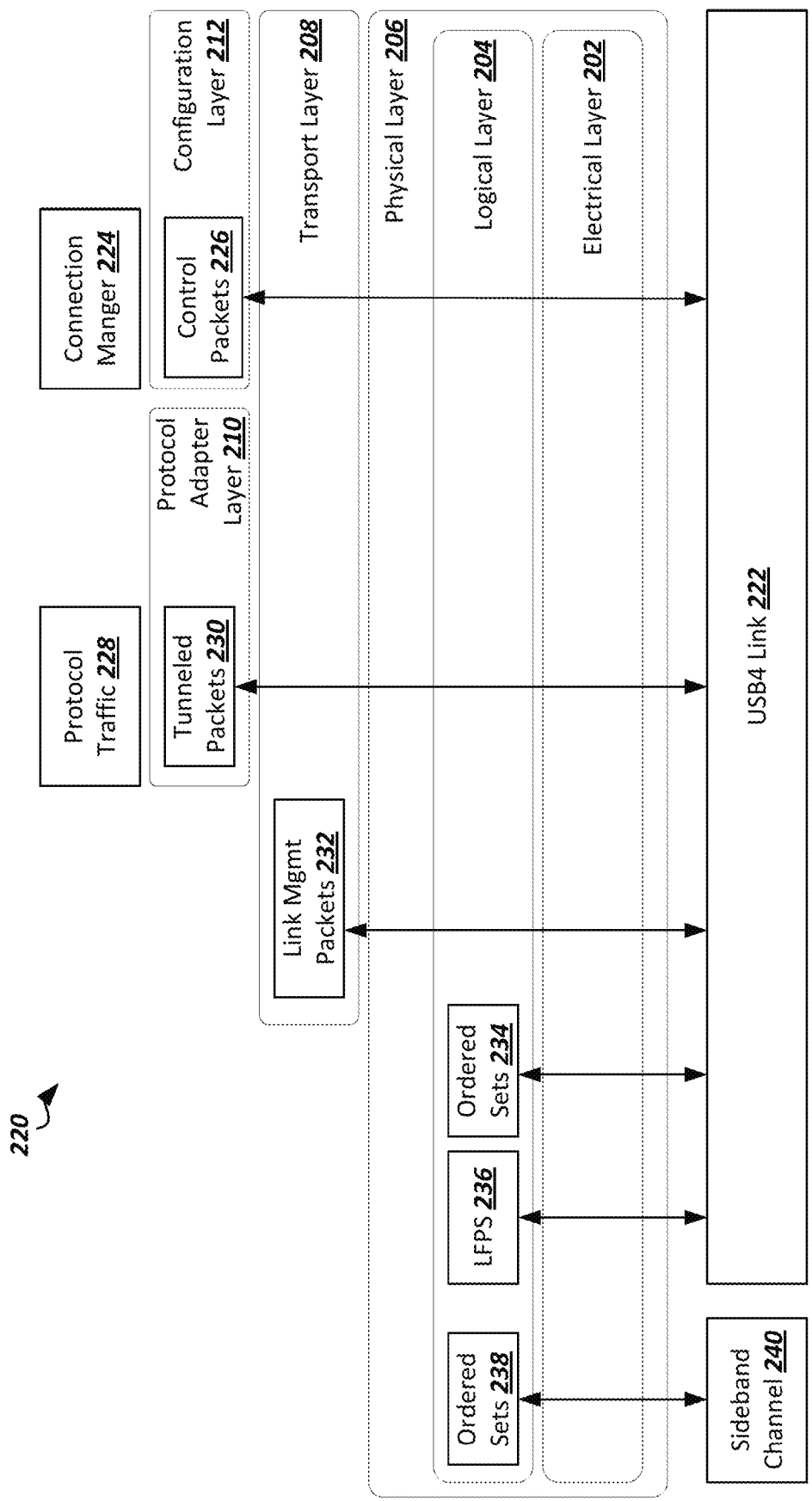
FIG. 2B is a schematic diagram illustrating example universal serial bus functional layer communication pathways in accordance with embodiments of the present disclosure.

FIG. 2B is a schematic diagram 220 illustrating example universal serial bus functional layer communication pathways in accordance with embodiments of the present disclosure. The communication construct can include a USB4 link 222 that communicates packets and ordered sets.

Control packets 226 are used by a connection manager 224 to configure and manage the routers across the bus. Control packets 226 are also used by a router to communicate with the connection manager 224. Control packets 226 are routed over the bus based on a route string that identifies a router's position in a spanning tree. When a control packet 226 originates from the connection manager 224, the route string identifies the router that the packet is targeted to. When a control racket 226 originates from a router, the router string identifies the router that sent the packet. A control adapter in a non-target Router forwards the packet to a USB4 Port. The control adapter of the target router consumes the control packet 226.

Protocol traffic 228 is encapsulated and tunneled over the USB4 fabric in tunneled packets 230. Tunneled packets 230 traverse the USB4 fabric along one or more paths.

Link management packets 232 are confined to a single USB4 Link 222. Link management packets 232 originate in the transport layer 208 of a router at one end of the link and terminate in the transport layer of the router at the other end of the link. The following link management packets are defined: Time Sync packets—Used to synchronize the clocks of the Routers on the bus; Flow Control packets—Used to prevent buffer overflow; Idle packets—Ensure a steady byte stream is fed to the Logical Layer when no other Transport Layer packets are being transmitted.

The logical layer 204 uses ordered sets 234 for tasks such as symbol synchronization, link training, and de-skew between lanes. Ordered sets 238 are 66-bit symbols (at Gen 2 speed) or 132-bit symbols (at Gen 3 speed).

The sideband channel 240 handles the following events: Lane Initialization; Connection or disconnect on a USB4 port; Lane disable or enable; and Entry or exit from Sleep state.

Low frequency periodic signaling (LFPS) 236 is used for in-band communication between two Link Partners when exiting power management link states.

Transport layer packets are either tunneled packets from protocol adapter layers, control packets from the configuration layer, or generated within transport layer (namely, link management packets generated within the transport layer).

Tunneled packets are generated by the protocol adapter layer of a source adapter and handed off to the transport layer. A tunneled packet shall have the header defined for transport layer packets. The protocol adapter layer of a source adapter shall fragment protocol traffic larger than 256 bytes into multiple tunneled packets. Reassembly of protocol traffic from tunneled packets shall be performed by the protocol adapter layer of the destination adapter.

The size of a transport layer packet is always a multiple of 4 bytes. The protocol adapter layer of a source adapter shall add between 0 and 3 bytes of padding to the payload of a tunneled packet to ensure that the tunneled packet is of a size that is a multiple of 4 bytes. The protocol adapter layer of the destination adapter shall remove any bytes of padding.

The content of the padding bytes is implementation-specific and cannot be assumed to have any specific values. However, it is recommended that zero-byte padding be used.

Figure 3:
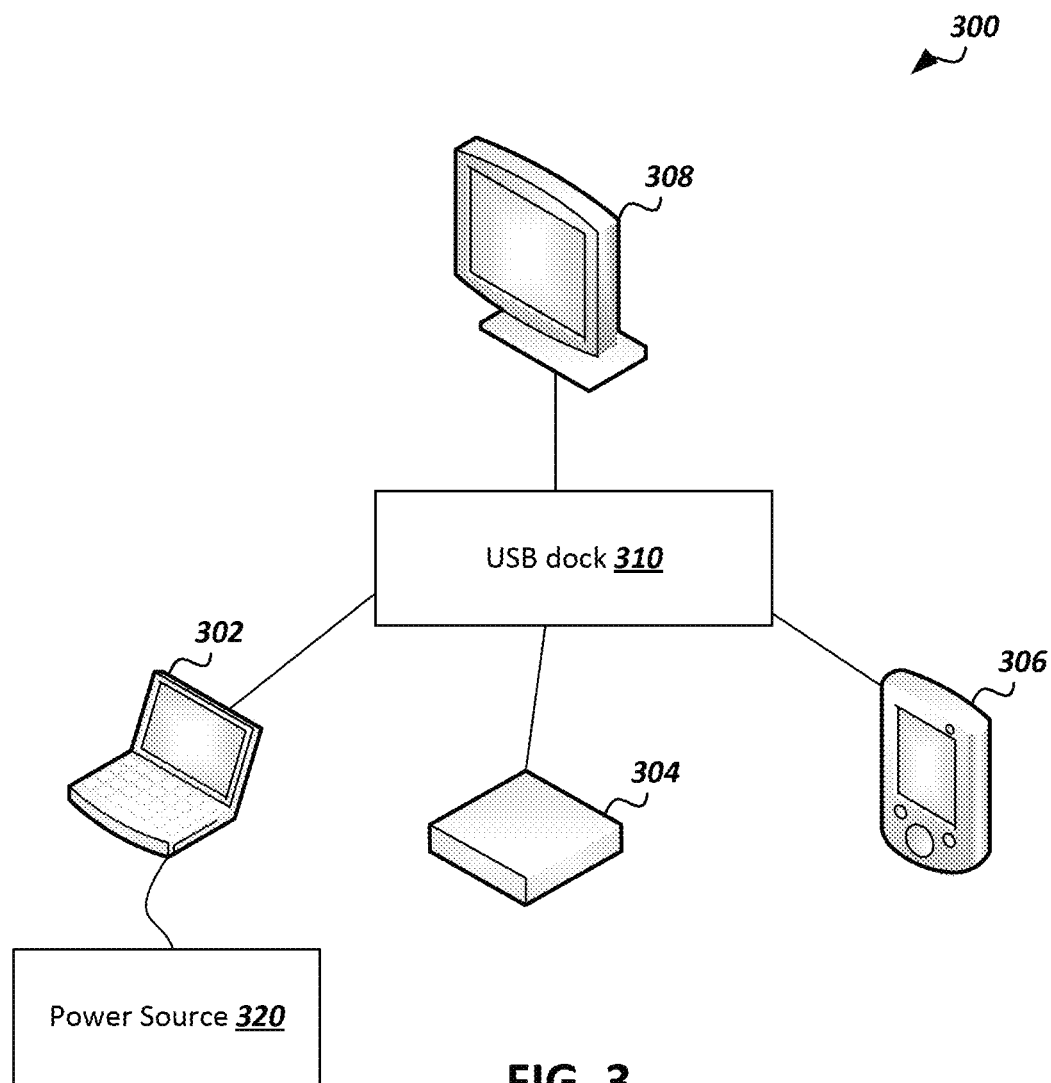
FIG. 3 illustrates an example multiport ecosystem.

FIG. 3 illustrates an example multiport ecosystem 300. In the example shown, the multiport ecosystem 300 includes a laptop 302, external drive 304, mobile device 306, and display 308, which are each communicably coupled to each other via a USB dock 310. The USB dock may be compliant with one or more versions of USB specifications (e.g., USB4), and each link between a device (e.g., laptop 302) and the USB dock 310 may utilize a USB-based protocol. In the example shown, the laptop 302 is connected to a power source 320, and may be a Source device as described above for one or more of the other devices shown (i.e., may provide power to one or more of the devices).

In the example ecosystem 300, device data may be tunneled over the USB links with the USB dock. For instance, the devices 302, 304, 306 may utilize USB-based ports that are governed by or associated with a USB-C/Power delivery policy (e.g., USB Power Delivery (PD) Specification 3.0 and/or in conjunction with USB Type-C (USB-C) Cable and Connector Specification 1.3), while the display 308 may be governed by or associated with a DisplayPort (DP) policy. Management of the DP low power modes may accordingly be outside the USB-based ecosystem (e.g., USB v4/USB-C/PD) such that when the DP system puts the display 308 into a low power mode the information is not propagated to a USB Device Policy Manager (DPM). The USB DPM may manage power delivery through the USB links and corresponding resources across one or more ports based on the device's local policy.

Figure 4:
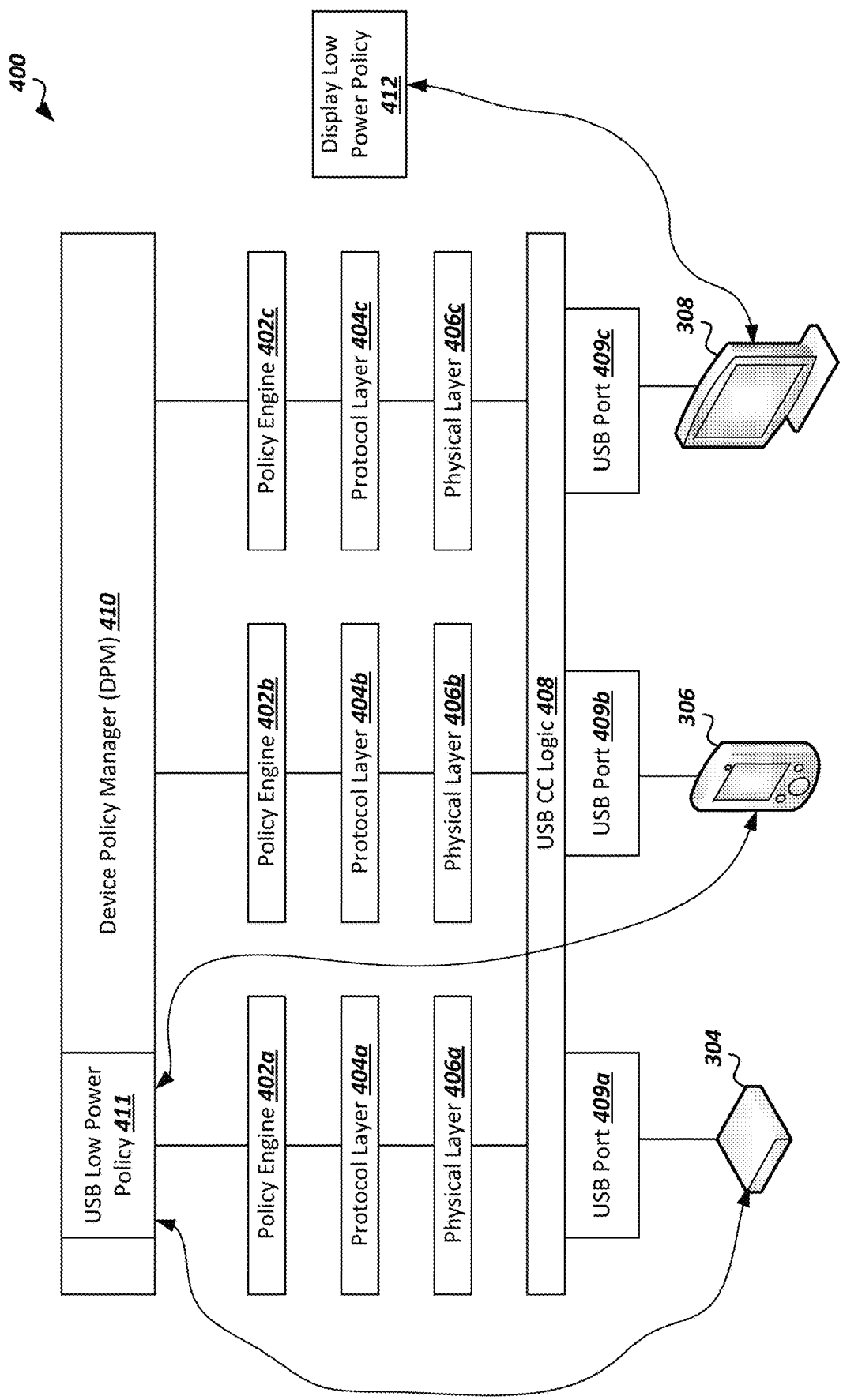
FIG. 4 illustrates an example communication stack diagram for devices of the example ecosystem of FIG. 3.

FIG. 4 illustrates an example communication stack diagram 400 for devices of the example ecosystem 300 of FIG. 3. In particular, the diagram shown illustrates the disconnect between the Display low power policy module 412 and the USB-based DPM 410 (and USB low power policy 411). In the example shown, each of USB-based ports 409 includes configuration channel (CC) logic 408 coupled via an example communication stack to the DPM 410. Each of the USB-based ports 409 includes its own respective policy engine 402 to implement a power policy, e.g., low power policy, for the corresponding USB-based port 409. The respective policy engines 402 communicate with respective protocol layers 404 to enable messages to be exchanged via respective physical layers 406 for handling transmission and reception of bits for respective USB-based links.

In the example shown, the DPM 410 determines a power distribution policy for a plurality of devices to be coupled to the DPM 410 via respective USB-based ports 409. However, as shown, USB-based ports 409a and 409b are governed by a USB-based (e.g., USB-C/PD) low power policy 411, while USB-based port 409c is governed by a display low power policy 412 (e.g., as may be included in USB Type-C Alternate Mode DisplayPort 1.4 Specification or other alternate mode policy). Although FIG. 4 only shows two USB-based ports governed by a USB-based low power policy and one USB-based port governed by an alternate low power policy, embodiments may include any suitable number of devices (e.g., hosts and peripherals for data and power) that can be coupled to either low power policy via a USB-based port.

Figure 5:
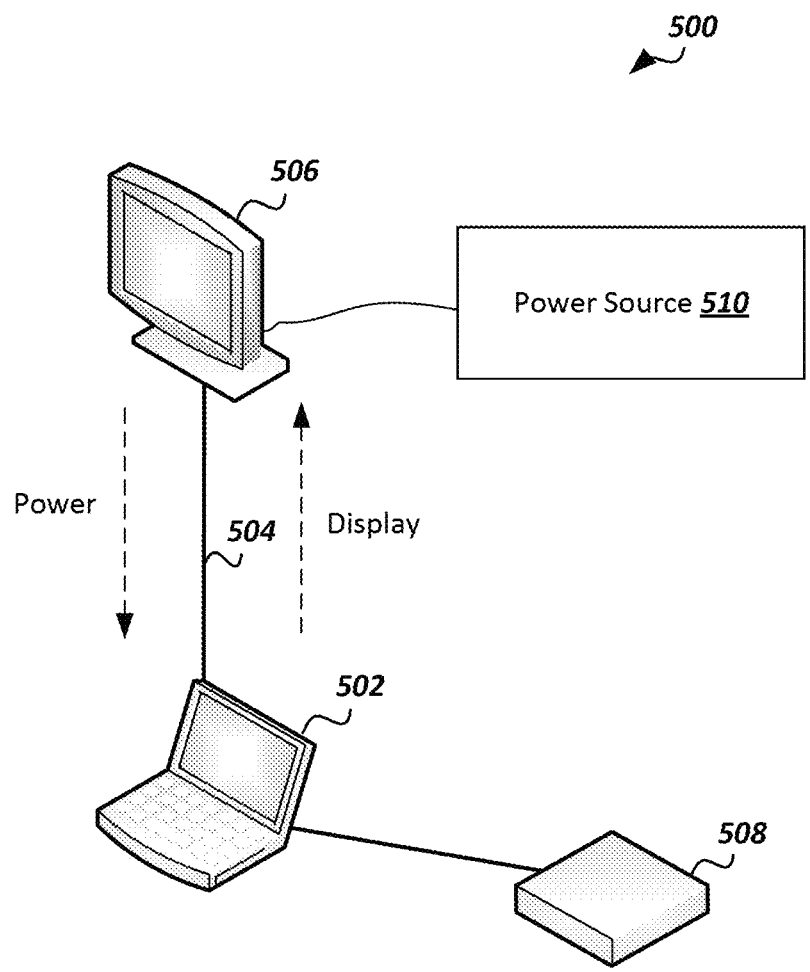
FIG. 5 illustrates another example multiport ecosystem.

Because the devices may be governed by different low power policies in a multiport ecosystem as shown in FIG. 4, conflicts may arise in certain scenarios, such as when a power sink device in the ecosystem is also providing data to other devices in the ecosystem. FIG. 5 illustrates another example multiport ecosystem 500, in which a display 506 is coupled to a power source 510 as well as a laptop 502 (over USB-based link 504, which may be compatible with USB v4 protocols). As shown, the laptop 502 acts as a power sink device to the display 506 and also provides display data to the display 506. The ecosystem 500 also includes a device 508 connected to the laptop 502 via a USB-based link. The device 508 may be a power sink device with respect to both the laptop 502 and the display 506.

In the scenario shown in FIG. 5, the display 506 (acting as a power source device for the laptop 502 on a DFP) would have negotiated the power delivery (PD) contract with a USB Suspend Bit cleared. This may also mean that other devices connected on the display 506 via a USB-based link may not adhere to suspend rules. However, when the laptop's graphics/display module places the display 506 in low power mode (e.g., by writing to DPCD address 0x0600), it may be important for the laptop policy manager to be aware of the low power mode and enable the complete ecosystem 500 to go to low power mode. On the flip side the display module of the laptop 502 may not write to address 0x600 when the DPM is charging the laptop 502 or is in need of high-power operation (necessitating a connection between these functions and the power policy manager). Accordingly, in an ecosystem such as ecosystem 500, the DPM lacks information of low power modes of the various functions that are made available on the USB-based ports. This lack of information to the DPM may lead to inefficient power distribution and power conservation, among other potential issues.

Thus, in embodiments of the present disclosure, additional information on the low power state of a device utilizing tunneled protocols may be provided to a host interface Connection Manager (CM), which may in turn influence USB PD Operating System Power Policy Manager (OSPPM). For example, the tunneled control plane may be monitored by snooping for power commands in the tunneled protocols, such as commands indicating or commanding power state changes (e.g., changes to a low power state). A status register in a USB host interface (e.g., one compatible with protocols based on the USB v4 specification) may be updated and may generate an interrupt to indicate the detected change in power state. This information may be passed onto the DPM by the Connection Manager using the OSPPM, which processes the power state change and sets a policy with the available power. In some embodiments, a USB Connection Manager (CM) and the USB-C/PD DPM are provided with additional information to have a complete set of information related to the tunneled protocol low power states. To get the low power state information, the control plane of the tunneled functions may be monitored.

In current implementations, information related to a power source's low power mode may not be available to other devices, and thus some amount of available power (e.g., up to 1.5 A) may not be redistributed to other devices connected to the multiport ecosystem (or conserved). However, embodiments of the present disclosure may allow for power sink devices to have knowledge of power state transitions in power source devices, such as those that are not governed by USB-based low power policies (e.g., display devices as described above). By being aware of these power state transitions, power may be redistributed or conserved.

Figure 6:
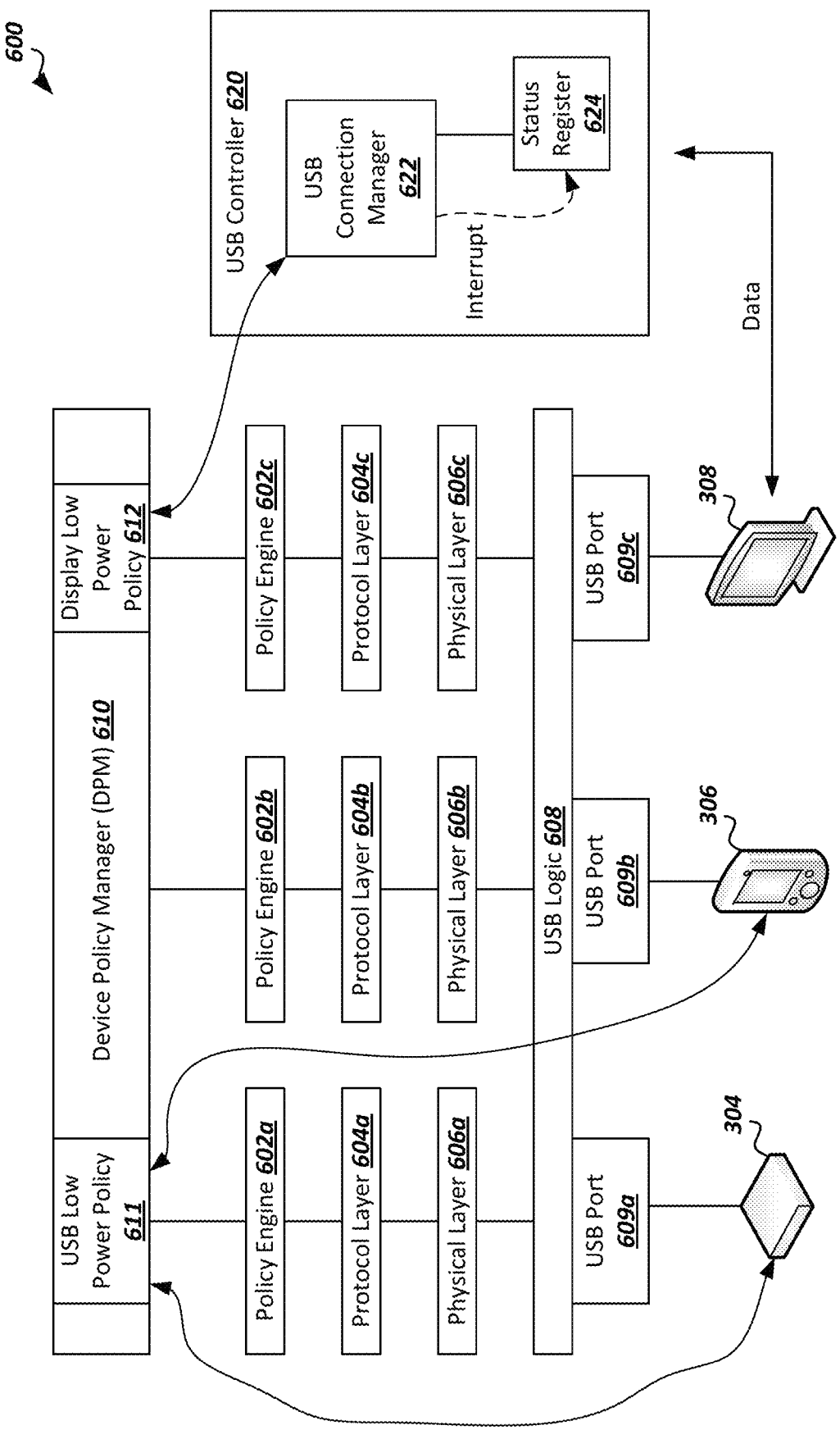
FIG. 6 illustrates an example communication stack diagram in accordance with embodiments of the present disclosure.

FIG. 6 illustrates an example communication stack diagram 600 in accordance with embodiments of the present disclosure. Like the example shown in FIG. 4, each of USB-based ports 609 includes configuration channel (CC) logic 608 coupled via an example communication stack to the DPM 610. Each of the USB-based ports 609 includes its own respective policy engine 602 to implement a power policy, e.g., low power policy, for the corresponding USB-based port 609. The respective policy engines 602 communicate with respective protocol layers 604 to enable messages to be exchanged via respective physical layers 606 for handling transmission and reception of bits for respective USB-based links.

However, in the example shown, a USB Connection Manager (CM) 622 monitors communications related to power state transitions as described above. The USB CM 622 may be implemented as firmware, software, or a combination thereof, and may run on a host USB Controller 620. The CM 622 may be responsible for establishing and managing protocols (e.g., USB 3.x, DP, or PCIe-based protocols) tunneled on USB links in the ecosystem. The CM 622 may detect the power state transition information by snooping the tunneled protocols (e.g., USB 3.x, DP, or PCIe-based protocols) on the USB links of the ecosystem for power commands and updating a status register 624 in the USB Controller 620. The CM 622 may indicate the power state transition commands to the DPM 610 via the host interface. With the details from the control plane and details of entry and exit of low power states, the DPM 610 can then conserve or redistribute power that would have otherwise been consumed by devices in the ecosystem.

Figure 7:
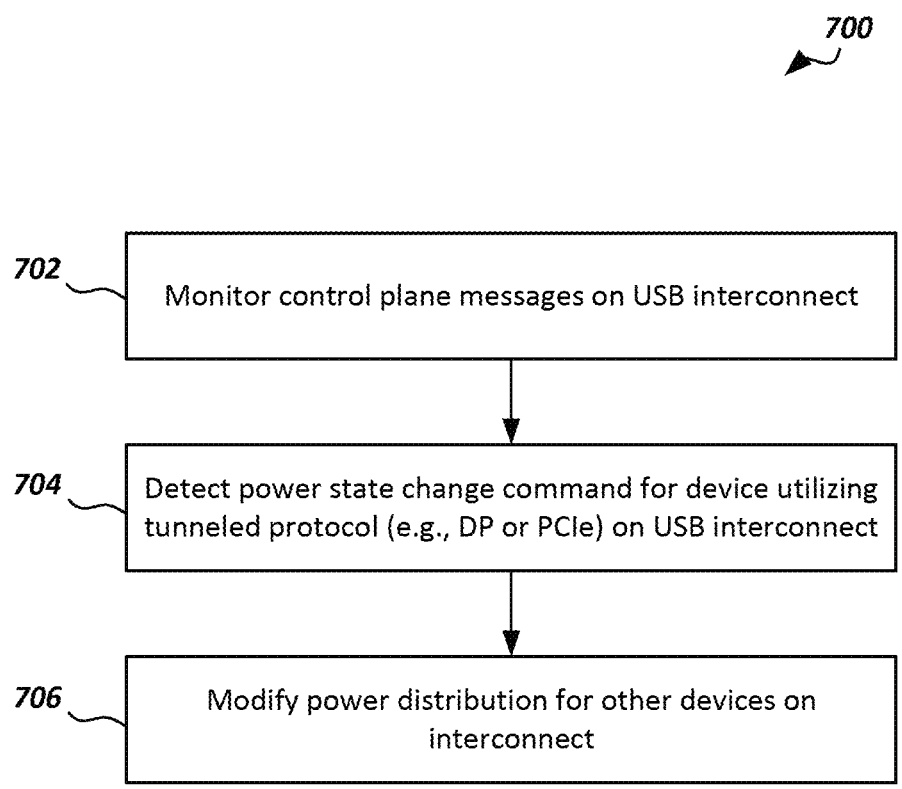
FIG. 7 is a flow diagram of an example process of detecting and communicating power transition information in a multiport ecosystem in accordance with embodiments of the present disclosure.

FIG. 7 is a flow diagram of an example process 700 of detecting and communicating power transition information in a multiport ecosystem in accordance with embodiments of the present disclosure. Operations in the example process may be performed by components of a device that implements a USB Connection Manager or one or more other aspects of a USB Controller. In some embodiments, one or more computer-readable media may be encoded with instructions (e.g., software, firmware, or a combination thereof) that implement one or more of the operations in the example process. The example process may include additional or different operations, and the operations may be performed in the order shown or in another order. In some cases, one or more of the operations shown in FIG. 7 are implemented as processes that include multiple operations, sub-processes, or other types of routines. In some cases, operations can be combined, performed in another order, performed in parallel, iterated, or otherwise repeated or performed another manner.

At 702, control plane messages of a USB-based interconnect are monitored.

The USB-based interconnect may implement a USB4 protocol in certain embodiments. The USB-based interconnect may include a set of devices that utilize a USB-based protocol (e.g., USB 3.x) on the USB-based interconnect (e.g., devices 304, 306 of FIG. 6), and another set of devices that utilize a non-USB-based protocol (e.g., DP, PCIe, etc.) that is tunneled over the USB-based interconnect (e.g., display 308 of FIG. 6). The monitoring of control plane messages may be performed by a USB connection manager (e.g., USB CM 622 of FIG. 6) implemented by a USB host controller (e.g., 620 of FIG. 6), e.g., as described above. The CM may snoop the control plane messages for power state change commands issued by the devices coupled to the interconnect.

At 704, a power stage change command is detected on the USB interconnect for a device that utilized a tunneled protocol (e.g., DP, PCIe, etc.) on the interconnect. The power state change command may be a low power command issued to the device to cause the device to transition into a low power mode (e.g., a command from laptop 302 to display 308 of FIG. 3, or from laptop 502 to display 506 of FIG. 5).

At 706, power distribution is modified for one or more devices on the interconnect based on the detected power state change command. This may include, for example, modifying a power distribution policy for the devices (e.g., policies 611, 612 of FIG. 6). In cases where the device for which the power state change command was issued is a power sink device (i.e., receives power over the interconnect), power may be redistributed to other devices coupled to the interconnect, or may be conserved or (e.g., not used). In cases where the device for which the power state change command was issued is a power source device (i.e., provides power to one or more other devices over the interconnect), one or more device power policies may be renegotiated, e.g., as described above).

In some embodiments, an interrupt may be generated based on detecting the power state change command at 704. The interrupt may be generated, for example, by setting one or more bits of a status register of a USB host controller (e.g., status register 624 of FIG. 6).

Figure 8:
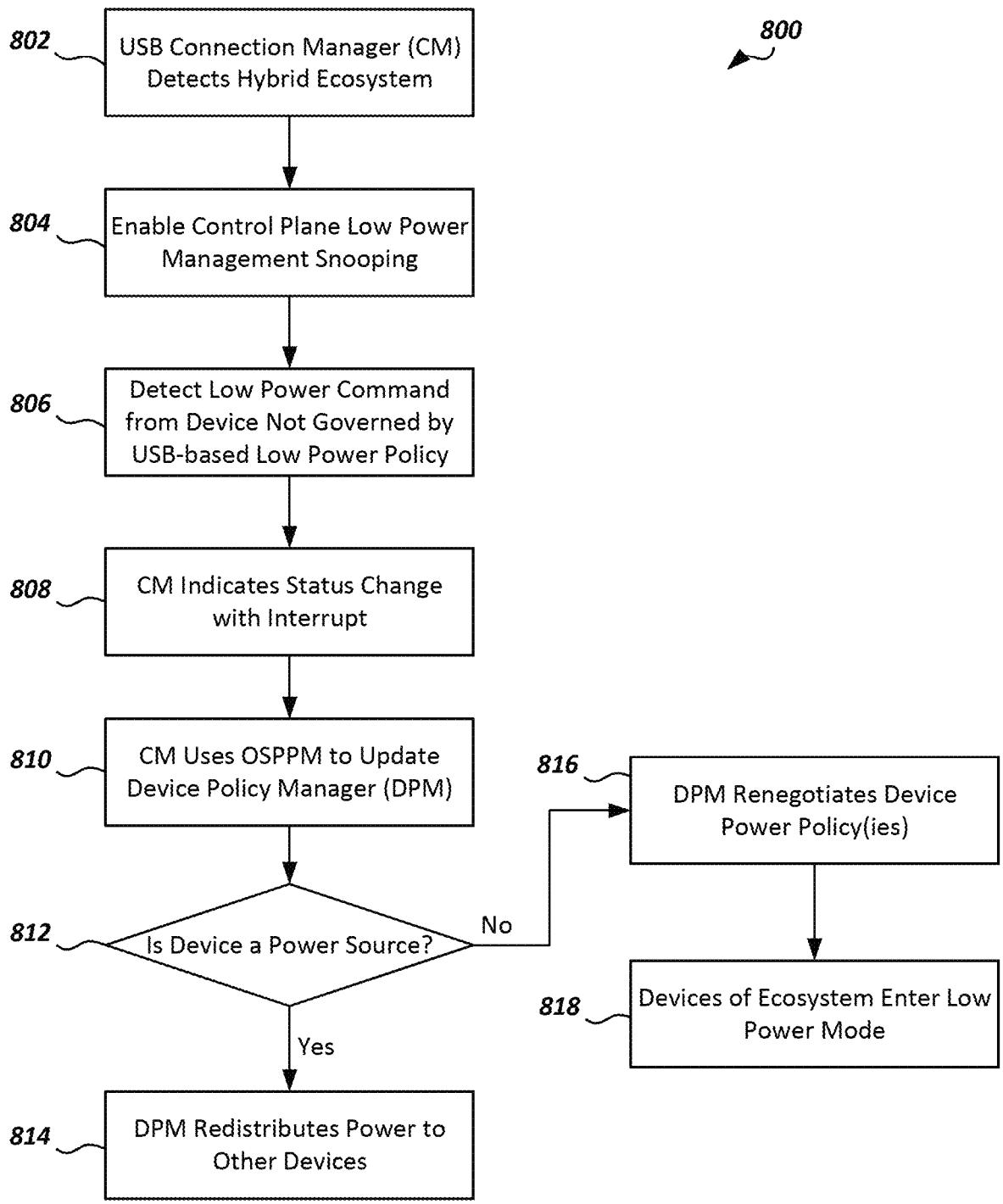
FIG. 8 is a flow diagram of another example process of detecting and communicating power transition information in a multiport ecosystem in accordance with embodiments of the present disclosure.

FIG. 8 is a flow diagram of an example process 800 of detecting and communicating power transition information in a multiport ecosystem in accordance with embodiments of the present disclosure. Operations in the example process may be performed by components of a device that implements a USB Connection Manager or one or more other aspects of a USB Controller. In some embodiments, one or more computer-readable media may be encoded with instructions (e.g., software, firmware, or a combination thereof) that implement one or more of the operations in the example process. The example process may include additional or different operations, and the operations may be performed in the order shown or in another order. In some cases, one or more of the operations shown in FIG. 8 are implemented as processes that include multiple operations, sub-processes, or other types of routines. In some cases, operations can be combined, performed in another order, performed in parallel, iterated, or otherwise repeated or performed another manner.

At 802, a USB Connection Manager (CM) (e.g., USB CM 622 of FIG. 6) detects a hybrid ecosystem. A hybrid ecosystem may refer to a device ecosystem (e.g., ecosystem 300 of FIG. 3 or ecosystem 500 of FIG. 5) wherein the devices of the ecosystem are interconnected using USB-based ports and links, but where at least some of the ecosystem devices utilize different communication protocols within the ecosystem (e.g., a mixture of USB-based, PCIe-based, or other types of protocols tunneled over the USB-based links). The hybrid ecosystem may include one or more devices governed by a USB-based low power policy (e.g., policy 611 of FIG. 6) and one or more other devices governed by another low power policy (e.g., display low power policy 612 of FIG. 6). The USB CM may detect the hybrid ecosystem in response to or otherwise based on establishing tunnels over the USB-based links for the multiple protocols (e.g., USB 3.x, PCIe, or other types of protocols).

At 804, the USB CM enables control plane low power management snooping. This may include monitoring control plane messages within the ecosystem for power state change commands for the one or more devices of the ecosystem. For instance, the USB CM may snoop the control plane information for low power commands or modes in the tunneled protocols (e.g., DP or PCIe). The snooping may be enabled on the control plane through one or more registers of a USB host interface.

At 806, the USB CM detects a low power command for a device not governed by a USB-based low power policy. As some examples, the device may be governed by a DisplayPort (DP)-based low power policy or a PCIe-based low power policy.

At 808, the USB CM indicates the power transition/status change by generating or otherwise indicating an interrupt. For instance, the USB CM may set one or more bits in a status register of a USB Controller (e.g., status register 424 of USB controller 420 of FIG. 4).

At 810, the USB CM may update a Device Policy Manager (DPM, e.g., DPM 410 of FIG. 4) using an OSPPM.

At 812, it is determined whether the device to which the power state change command is issued is a power source for one or more other devices in the ecosystem. If the device does provide power to other devices of the ecosystem, then the DPM redistributes power to other devices of the ecosystem at 814. For instance, referring to the example shown in FIG. 3, if the USB CM detects that the power state change is a low power command to the display 308 (causing it to transition to a low power mode), then the DPM may modify device power policies to redistribute the power that would have otherwise gone to the display 308 to the other devices of the ecosystem (e.g., 304, 306).

If the device to which the power state change command is issued does not provide power to other devices of the ecosystem (e.g., is a power sink device), then the DPM renegotiates the device power policy/policies for the ecosystem (e.g., renegotiates the contract with the USB Suspend bit described above) at 816 and the devices of the ecosystem enter a low power mode at 818. For instance, referring to the example shown in FIG. 5, if the USB CM detects that the display 506 (the power source in the example) has received a power state change command to transition a low power mode, then DPM may renegotiate the power policy for the devices of the ecosystem (e.g., 502, 508 of the ecosystem 500) and put the devices into a low power mode as well.

Figure 9:
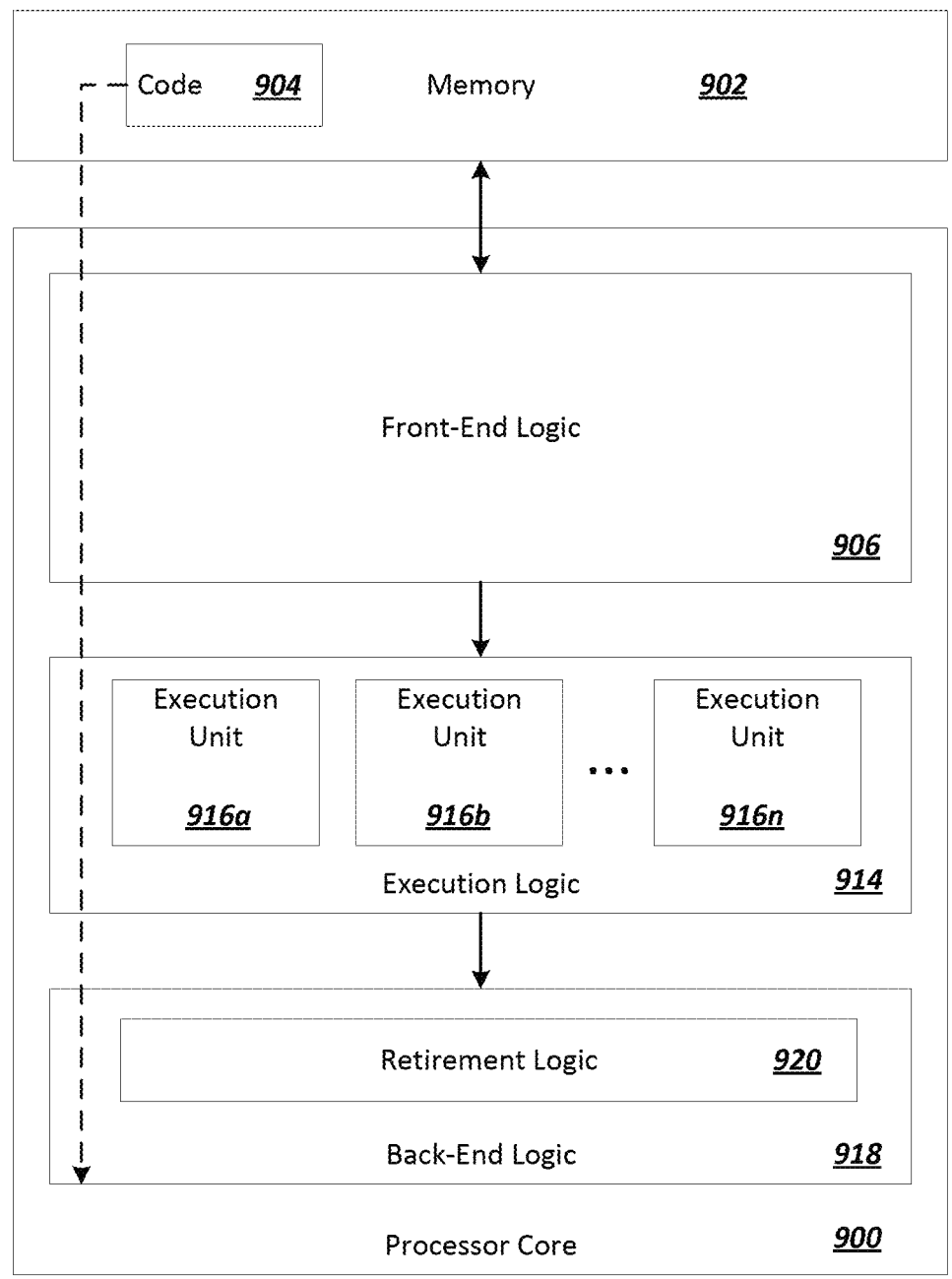
FIG. 9 is an example illustration of a processor according to an embodiment.
Figure 10:
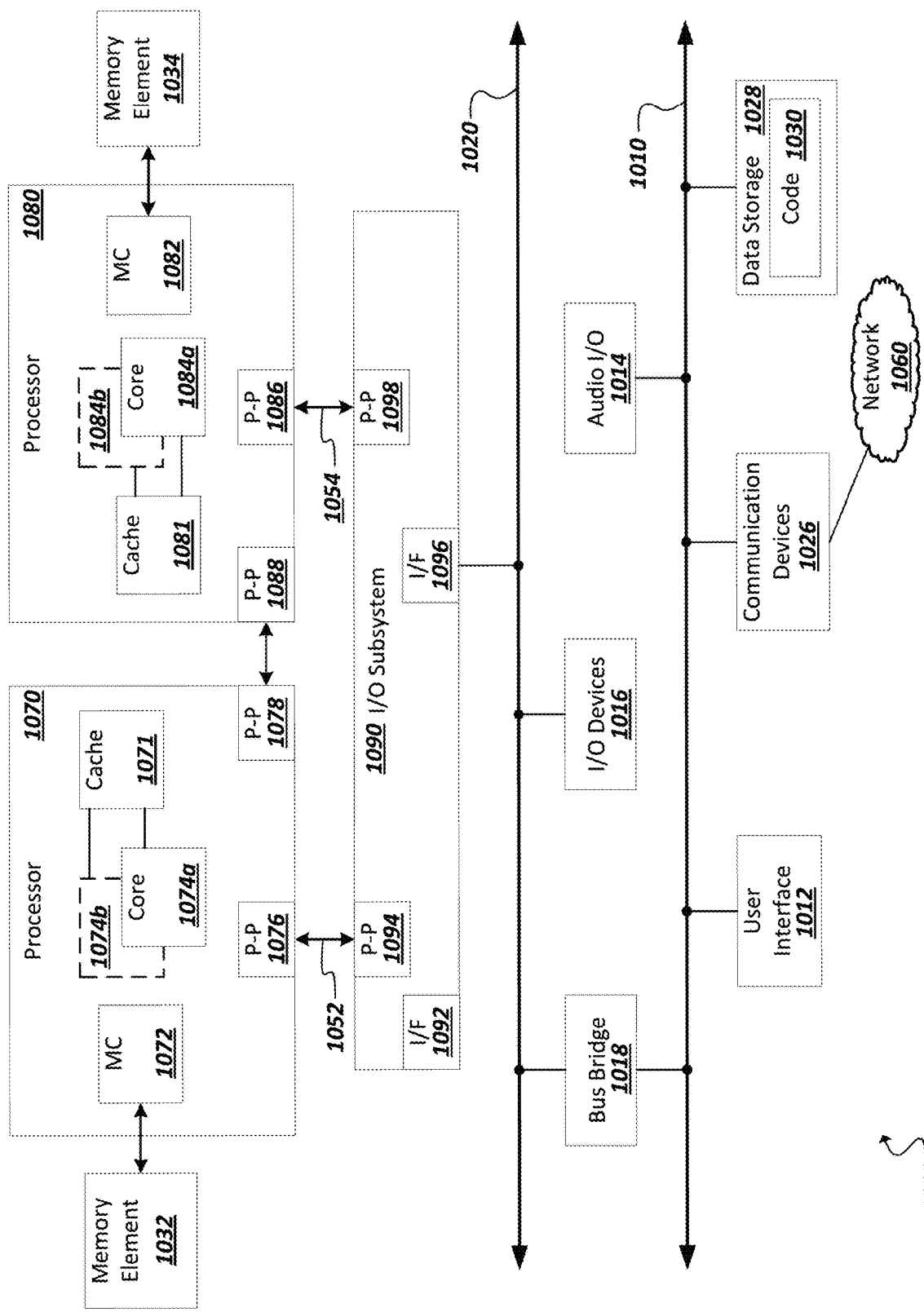
FIG. 10 illustrates a computing system that is arranged in a point-to-point (PtP) configuration according to an embodiment.

FIGS. 9-10 are block diagrams of example computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 9-10.

FIG. 9 is an example illustration of a processor according to an embodiment. Processor 900 is an example of a type of hardware device that can be used in connection with the implementations above. Processor 900 may be any type of processor, such as a microprocessor, an embedded processor, a digital signal processor (DSP), a network processor, a multi-core processor, a single core processor, or other device to execute code. Although only one processor 900 is illustrated in FIG. 9, a processing element may alternatively include more than one of processor 900 illustrated in FIG. 9. Processor 900 may be a single-threaded core or, for at least one embodiment, the processor 900 may be multi-threaded in that it may include more than one hardware thread context (or "logical processor") per core.

FIG. 9 also illustrates a memory 902 coupled to processor 900 in accordance with an embodiment. Memory 902 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 900 can execute any type of instructions associated with algorithms, processes, or operations detailed herein. Generally, processor 900 can transform an element or an article (e.g., data) from one state or thing to another state or thing.

Code 904, which may be one or more instructions to be executed by processor 900, may be stored in memory 902, or may be stored in software, hardware, firmware, or any suitable combination thereof, or in any other internal or external component, device, element, or object where appropriate and based on particular needs. In one example, processor 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 also includes register renaming logic 910 and scheduling logic 912, which generally allocate resources and queue the operation corresponding to the instruction for execution.

Processor 900 can also include execution logic 914 having a set of execution units 916a, 916b, 916n, etc. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor 900 allows out of order execution but requires in order retirement of instructions. Retirement logic 920 may take a variety of known forms (e.g., re-order buffers or the like). In this manner, processor 900 is transformed during execution of code 904, at least in terms of the output generated by the decoder, hardware registers and tables utilized by register renaming logic 910, and any registers (not shown) modified by execution logic 914.

Although not shown in FIG. 9, a processing element may include other elements on a chip with processor 900. For example, a processing element may include memory control logic along with processor 900. The processing element may include I/O control logic and/or may include I/O control logic integrated with memory control logic. The processing element may also include one or more caches. In some embodiments, non-volatile memory (such as flash memory or fuses) may also be included on the chip with processor 900.

FIG. 10 illustrates a computing system 1000 that is arranged in a point-to-point (PtP) configuration according to an embodiment. In particular, FIG. 10 shows a system where processors, memory, and input/output devices are interconnected by a number of point-to-point interfaces. Generally, one or more of the computing systems described herein may be configured in the same or similar manner as computing system 900.

Processors 1070 and 1080 may also each include integrated memory controller logic (MC) 1072 and 1082 to communicate with memory elements 1032 and 1034. In alternative embodiments, memory controller logic 1072 and 1082 may be discrete logic separate from processors 1070 and 1080. Memory elements 1032 and/or 1034 may store various data to be used by processors 1070 and 1080 in achieving operations and functionality outlined herein.

Processors 1070 and 1080 may be any type of processor, such as those discussed in connection with other figures. Processors 1070 and 1080 may exchange data via a point-to-point (PtP) interface 1050 using point-to-point interface circuits 1078 and 1088, respectively. Processors 1070 and 1080 may each exchange data with a chipset 1090 via individual point-to-point interfaces 1052 and 1054 using point-to-point interface circuits 1076, 1086, 1094, and 1098. Chipset 1090 may also exchange data with a co-processor 1038, such as a high-performance graphics circuit, machine learning accelerator, or other co-processor 1038, via an interface 1039, which could be a PtP interface circuit. In alternative embodiments, any or all of the PtP links illustrated in FIG. 10 could be implemented as a multi-drop bus rather than a PtP link.

Chipset 1090 may be in communication with a bus 1020 via an interface circuit 1096. Bus 1020 may have one or more devices that communicate over it, such as a bus bridge 1018 and I/O devices 1016. Via a bus 1010, bus bridge 1018 may be in communication with other devices such as a user interface 1012 (such as a keyboard, mouse, touchscreen, or other input devices), communication devices 1026 (such as modems, network interface devices, or other types of communication devices that may communicate through a computer network 1060), audio I/O devices 1014, and/or a data storage device 1028. Data storage device 1028 may store code 1030, which may be executed by processors 1070 and/or 1080. In alternative embodiments, any portions of the bus architectures could be implemented with one or more PtP links.

The computer system depicted in FIG. 10 is a schematic illustration of an embodiment of a computing system that may be utilized to implement various embodiments discussed herein. It will be appreciated that various components of the system depicted in FIG. 10 may be combined in a system-on-a-chip (SoC) architecture or in any other suitable configuration capable of achieving the functionality and features of examples and implementations provided herein.

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

In general, one aspect of the subject matter described in this specification can be embodied in methods and executed instructions that include or cause the actions of identifying a sample that includes software code, generating a control flow graph for each of a plurality of functions included in the sample, and identifying, in each of the functions, features corresponding to instances of a set of control flow fragment types. The identified features can be used to generate a feature set for the sample from the identified features These and other embodiments can each optionally include one or more of the following features. The features identified for each of the functions can be combined to generate a consolidated string for the sample and the feature set can be generated from the consolidated string. A string can be generated for each of the functions, each string describing the respective features identified for the function. Combining the features can include identifying a call in a particular one of the plurality of functions to another one of the plurality of functions and replacing a portion of the string of the particular function referencing the other function with contents of the string of the other function. Identifying the features can include abstracting each of the strings of the functions such that only features of the set of control flow fragment types are described in the strings. The set of control flow fragment types can include memory accesses by the function and function calls by the function. Identifying features can include identifying instances of memory accesses by each of the functions and identifying instances of function calls by each of the functions. The feature set can identify each of the features identified for each of the functions. The feature set can be an n-graph.

Further, these and other embodiments can each optionally include one or more of the following features. The feature set can be provided for use in classifying the sample. For instance, classifying the sample can include clustering the sample with other samples based on corresponding features of the samples. Classifying the sample can further include determining a set of features relevant to a cluster of samples. Classifying the sample can also include determining whether to classify the sample as malware and/or determining whether the sample is likely one of one or more families of malware. Identifying the features can include abstracting each of the control flow graphs such that only features of the set of control flow fragment types are described in the control flow graphs. A plurality of samples can be received, including the sample. In some cases, the plurality of samples can be received from a plurality of sources. The feature set can identify a subset of features identified in the control flow graphs of the functions of the sample. The subset of features can correspond to memory accesses and function calls in the sample code.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. It will be understood that certain examples may be combined with certain other examples, in certain embodiments.

Example 1 includes an apparatus comprising a host controller to implement one or more layers of a Universal Serial Bus (USB)-based protocol to provide an interconnect for a plurality of devices, wherein the host controller is to: monitor control plane messages on the interconnect; detect, in the control plane messages, a power state change command for a device coupled to the interconnect, wherein the devices utilizes a tunneled protocol on the interconnect; and modify power distribution for one or more other devices of the interconnect based on detecting the power state change command.

Example 2 includes the subject matter of Example 1 and/or other Example(s), and optionally, wherein the host controller is to implement a connection manager (CM) to monitor the control plane messages, and the CM is to generate an interrupt based on detecting power state change commands.

Example 3 includes the subject matter of Example 2 and/or other Example(s), and optionally, wherein the CM is to generate the interrupt by setting one or more bits of a status register in the host controller.

Example 4 includes the subject matter of Example 2 and/or other Example(s), and optionally, wherein host controller is further to implement a device policy manager (DPM) to manage power delivery policies for devices coupled to the interconnect, and the CM is to provide an indication of the power state change command to the DPM using an Operating System Power Policy Manager (OSPPM).

Example 5 includes the subject matter of Example 1 and/or other Example(s), and optionally, wherein the power state change command is a low power command for a power sink device, and the host controller is to redistribute power to one or more other devices coupled to the interconnect based on detection of the low power command.

Example 6 includes the subject matter of Example 1 and/or other Example(s), and optionally, wherein the power state change command is a low power command for a power source device, and the host controller is to cause one or more other devices coupled to the interconnect to transition into a low power mode based on detection of the low power command.

Example 7 includes the subject matter of Example 6 and/or other Example(s), and optionally, wherein the host controller is to cause one or more other devices coupled to the interconnect to transition into a low power mode by renegotiating device power policies for the devices.

Example 8 includes the subject matter of Example 1 and/or other Example(s), and optionally, wherein the tunneled protocol is one of a DisplayPort-based protocol and a Peripheral Component Interconnect Express (PCIe)-based protocol.

Example 9 includes the subject matter of Example 1 and/or other Example(s), and optionally, wherein the USB-protocol is a USB4 protocol.

Example 10 includes a method comprising: monitoring control plane messages on a Universal Serial Bus (USB)-based interconnect; detecting, in the control plane messages, a power state change command for a device coupled to the USB-based interconnect, wherein the device utilizes a tunneled protocol on the USB-based interconnect; and modifying power distribution to one or more other devices of the USB-based interconnect based on detecting the power state change command.

Example 11 includes the subject matter of Example 10 and/or other Example(s), and optionally, further comprising generating an interrupt based on detecting the power state change command.

Example 12 includes the subject matter of Example 11 and/or other Example(s), and optionally, wherein generating an interrupt comprises setting one or more bits of a status register in a USB controller.

Example 13 includes the subject matter of Example 10 and/or other Example(s), and optionally, further comprising determining that the device is a power sink, wherein modifying power distribution comprises redistributing power to one or more devices coupled to the USB-based interconnect.

Example 14 includes the subject matter of Example 10 and/or other Example(s), and optionally, further comprising determining that the device is a power source, wherein modifying power distribution comprises renegotiating a device power policy for one or more other devices coupled to the USB-based interconnect.

Example 15 includes the subject matter of Example 10 and/or other Example(s), and optionally, wherein USB-based interconnect implements a USB4 protocol, and the tunneled protocol is one of a DisplayPort-based protocol and a Peripheral Component Interconnect Express (PCIe)-based protocol.

Example 16 includes a system comprising: a first device; a second device coupled to the first device via a Universal Serial Bus (USB)-based interconnect; a third device coupled to the first and second devices via the USB-based interconnect, wherein the third device communicates with the first and second devices on the USB-based interconnect using a tunneled protocol; wherein the first device comprises a host controller to implement a connection manager (CM) and a device policy manager (DPM), the CM to: detect a low power command for the second device, the low power command to cause the second device to transition to a low power mode; and provide an indication of the low power command to the DPM; wherein the DPM is to manage power distribution policies for the devices based on the indication.

Example 17 includes the subject matter of Example 16 and/or other Example(s), and optionally, wherein the CM is to provide an indication of the low power command to the DPM using an Operating System Power Policy Manager (OSPPM).

Example 18 includes the subject matter of Example 16 and/or other Example(s), and optionally, wherein the DPM is to redistribute power to the second device based on the indication.

Example 19 includes the subject matter of Example 16 and/or other Example(s), and optionally, wherein the DPM is to modify a device power policy for the second device based on the indication.

Example 20 includes the subject matter of Example 16 and/or other Example(s), and optionally, wherein the USB-based interconnect implements a USB4 protocol, and the tunneled protocol is one of a DisplayPort-based protocol and a Peripheral Component Interconnect Express (PCIe)-based protocol.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:
1. An apparatus comprising:
a host controller to implement one or more layers of a Universal Serial Bus (USB)-based protocol to provide an interconnect for a plurality of devices, wherein the host controller is to:
monitor control plane messages on the interconnect;
detect, in the control plane messages, a power state change command for a device coupled to the inter- connect, wherein the device utilizes a tunneled protocol on the interconnect and is not governed by a USB-based power policy;

based on detecting the power state change, generate an interrupt by setting one or more bits of a status register of the host controller; and modify power distribution for one or more other devices of the interconnect based on detecting the power state change command, wherein at least one of the one or more other devices is governed by a USB-based power policy.

2. The apparatus of claim 1, wherein the host controller is to implement a connection manager (CM) to monitor the control plane messages.

3. The apparatus of claim 2, wherein the CM is to set the one or more bits of the status register in the host controller.

4. The apparatus of claim 2, wherein host controller is further to implement a device policy manager (DPM) to manage power delivery policies for devices coupled to the interconnect, and the CM is to provide an indication of the power state change command to the DPM using an Operating System Power Policy Manager (OSPPM).

5. The apparatus of claim 1, wherein the power state change command is a low power command for a power sink device, and the host controller is to redistribute power to one or more other devices coupled to the interconnect based on detection of the low power command.

6. The apparatus of claim 1, wherein the power state change command is a low power command for a power source device, and the host controller is to cause one or more other devices coupled to the interconnect to transition into a low power mode based on detection of the low power command.

7. The apparatus of claim 6, wherein the host controller is to cause one or more other devices coupled to the interconnect to transition into a low power mode by renegotiating device power policies for the devices.

8. The apparatus of claim 1, wherein the tunneled protocol is one of a DisplayPort-based protocol and a Peripheral Component Interconnect Express (PCIe)-based protocol.

9. The apparatus of claim 1, wherein the USB-based protocol is a USB4 protocol.

10. A method comprising:

monitoring control plane messages on a Universal Serial Bus (USB)-based interconnect;

detecting, in the control plane messages, a power state change command for a device coupled to the USB-based interconnect, wherein the device utilizes a tunneled protocol on the USB-based interconnect and is not governed by a USB-based power policy;

generating an interrupt based on detecting the power state change command, wherein generating the interrupt comprises setting one or more bits of a status register in a USB controller; and modifying power distribution to one or more other devices of the USB-based interconnect based on detecting the power state change command, wherein at least one of the one or more other devices is governed by a USB-based power policy.

11. The method of claim 10, further comprising determining that the device is a power sink, wherein modifying power distribution comprises redistributing power to one or more devices coupled to the USB-based interconnect.

12. The method of claim 10, further comprising determining that the device is a power source, wherein modifying power distribution comprises renegotiating a device power policy for one or more other devices coupled to the USB-based interconnect.

13. The method of claim 10, wherein USB-based interconnect implements a USB4 protocol, and the tunneled protocol is one of a DisplayPort-based protocol and a Peripheral Component Interconnect Express (PCIe)-based protocol.

14. A system comprising:

a first device;

a second device coupled to the first device via a Universal Serial Bus (USB)-based interconnect and implements a USB-based power policy;

a third device coupled to the first and second devices via the USB-based interconnect, wherein the third device communicates with the first and second devices on the USB-based interconnect using a tunneled protocol and implements a non-USB-based power policy;

wherein the first device comprises a host controller to implement a connection manager (CM) and a device policy manager (DPM), the CM to:

detect a low power command for the second device, the low power command to cause the second device to transition to a low power mode;

based on detecting the low power command, generate an interrupt by setting one or more bits of a status register of the host controller; and provide an indication of the low power command to the DPM; and wherein the DPM is to manage power distribution policies for the second and third devices based on the indication.

15. The system of claim 14, wherein the CM is to provide an indication of the low power command to the DPM using an Operating System Power Policy Manager (OSPPM).

16. The system of claim 14, wherein the DPM is to redistribute power to the second device based on the indication.

17. The system of claim 14, wherein the DPM is to modify the power policy for the second device based on the indication.

18. The system of claim 14, wherein the USB-based interconnect implements a USB4 protocol, and the tunneled protocol is one of a DisplayPort-based protocol and a Peripheral Component Interconnect Express (PCIe)-based protocol.

* * * * *